United States Patent [19]

Wyatt

[11] Patent Number: 5,154,306
[45] Date of Patent: Oct. 13, 1992

[54] LIQUID CONTAINER AND HANDLE THEREFOR

[75] Inventor: William B. Wyatt, Brentwood, Tenn.

[73] Assignee: Aladdin Synergetics, Incorporation, Nashville, Tenn.

[21] Appl. No.: 680,757

[22] Filed: Apr. 29, 1991

[51] Int. Cl.5 .............................................. B65D 25/00
[52] U.S. Cl. ................................................... 220/770
[58] Field of Search .......................... 220/94 R, 85 H; 215/100 A; 229/1.5 H

[56] References Cited

U.S. PATENT DOCUMENTS

| | | | |
|---|---|---|---|
| 3,076,223 | 2/1963 | Reichold | 16/114 |
| 3,107,028 | 10/1963 | De Robertis | 220/94 R X |
| 3,115,916 | 12/1963 | Stephens | 220/94 R X |
| 3,456,864 | 7/1969 | Trombley et al. | 220/94 R X |
| 3,624,788 | 11/1971 | McMahon et al. | 220/85 H X |
| 3,807,594 | 4/1974 | Zimmermann et al. | 215/100 A |
| 4,273,246 | 6/1981 | Thompson | 215/100 A |
| 4,602,723 | 7/1986 | De Mars | 220/94 R X |
| 4,643,326 | 2/1987 | Klingler | 220/94 R |
| 4,964,522 | 10/1990 | Umetsu et al. | 220/94 R X |
| 4,993,675 | 2/1991 | Walker | 220/94 R X |

Primary Examiner—Steven M. Pollard
Attorney, Agent, or Firm—Banner, Birch, McKie & Beckett

[57] ABSTRACT

A container for bearing liquid, or the like, is described in which a handle, formed separately from the container, is fixedly secured to the container by a projection formed at one longitudinal end of the handle member organized to be frictionally received in a recess formed in the exterior wall of the container and a particularly formed headed connector device at the other end of the handle member mechanically secured to an adjacent portion of the container wall surface. The projection and the connector device are so disposed with respect to the handle member and the container that the locking action between the respective components is enhanced by the weight of the contents of the container.

13 Claims, 4 Drawing Sheets

LIQUID CONTAINER AND HANDLE THEREFOR

BACKGROUND OF THE INVENTION

The present invention relates to liquid containers, especially large capacity containers that are formed of plastic material and used for drinking or pouring purposes. More particularly, the invention relates to a simple and inexpensive arrangement for positively fixedly attaching a separately formed handle member to the container.

Liquid-bearing containers for drinking or pouring purposes that are formed of plastic material are well known. For example, thermally-insulated containers of the described type are inexpensively produced by forming the container of mutually spaced inner and outer shell members between which an empty plenum or one filled with a heat insulating material, such as polyurethane foam, is created. In the past it has been the practice to form the components of such containers and the handle member thereof separately for subsequent attachment thereto by conventional plastic molding procedures with the attachment of the handle members to the containers being effected by way of ultrasonically effected bonds produced by placing the handle member in engagement with the exterior surface of the container while ultrasonically vibrating the handle member to produce a fusion between the concerned components.

While the ultrasonic bonding of handle members of plastic material to containers formed of similar material is found to be suitable for containers of relatively small capacity, such as drinking cups adapted to contain less than about forty ounces of liquid, it has been determined that handle members cannot be effectively attached by this method to liquid bearing containers of greater capacity. Handles for drinking cups or pouring pitchers holding upwards of such amounts of liquid have not been effectively retained in connected engagement to large capacity containers when bonded thereto by such ultrasonic welding procedures.

It is to the amelioration of this problem, therefore, that the present invention is directed.

SUMMARY OF THE INVENTION

Accordingly, the present invention provides a container for liquid, or the like, having a handle affixed thereto, comprising a body defining said container having an exterior wall surface; said exterior wall surface and a downwardly extending flange member outwardly spaced from said wall surface cooperating to form a receptacle extending substantially parallel to the axis of said container body; a substantially rigid handle member having a projection formed at one longitudinal end thereof insertable in said receptacle; a connector device integrally formed on the opposite end of said handle member having a connecting element operative for fixed connection to said exterior wall surface; and an opening formed in said exterior wall surface at a location longitudinally spaced from said receptacle, said opening receiving said connecting element to securely fix said connector device to said container body when said handle member projection is received in said receptacle. In the described organization, the projection and the connector device on the handle member are disposed to extend essentially in the same direction, such that the weight of the liquid borne by the container serves to enhance the effect of the connection between the handle member and the container. Preferably, the handle member is formed with a generally L-shaped base from which a gripping element extends. The upper end of the long leg of the base contains the projection, which is preferably wedge-shaped and that is received in a recess formed in the exterior surface of the container body by a downwardly extending flange that may have an internal surface inclined opposite to the inclination of the surface of the wedge-shaped projection so as to effect a friction locking action therebetween. It is contemplated that the short leg of the handle member base will be provided with an expandable, headed connector device for securely fixing the handle member to the container body. The connecting element on such connector device may be circular in section, but is preferably of rectangular cross section for structural purposes. The connecting element of the device is upstanding from the base and is designed to be received in and retained by a hole of complementary shape formed on the external surface of the container.

The objects and advantages of the invention will be apparent from the following detailed description taken in conjunction with the accompanying drawings.

DESCRIPTION OF A PREFERRED EMBODIMENT OF THE INVENTION

Figure 1:
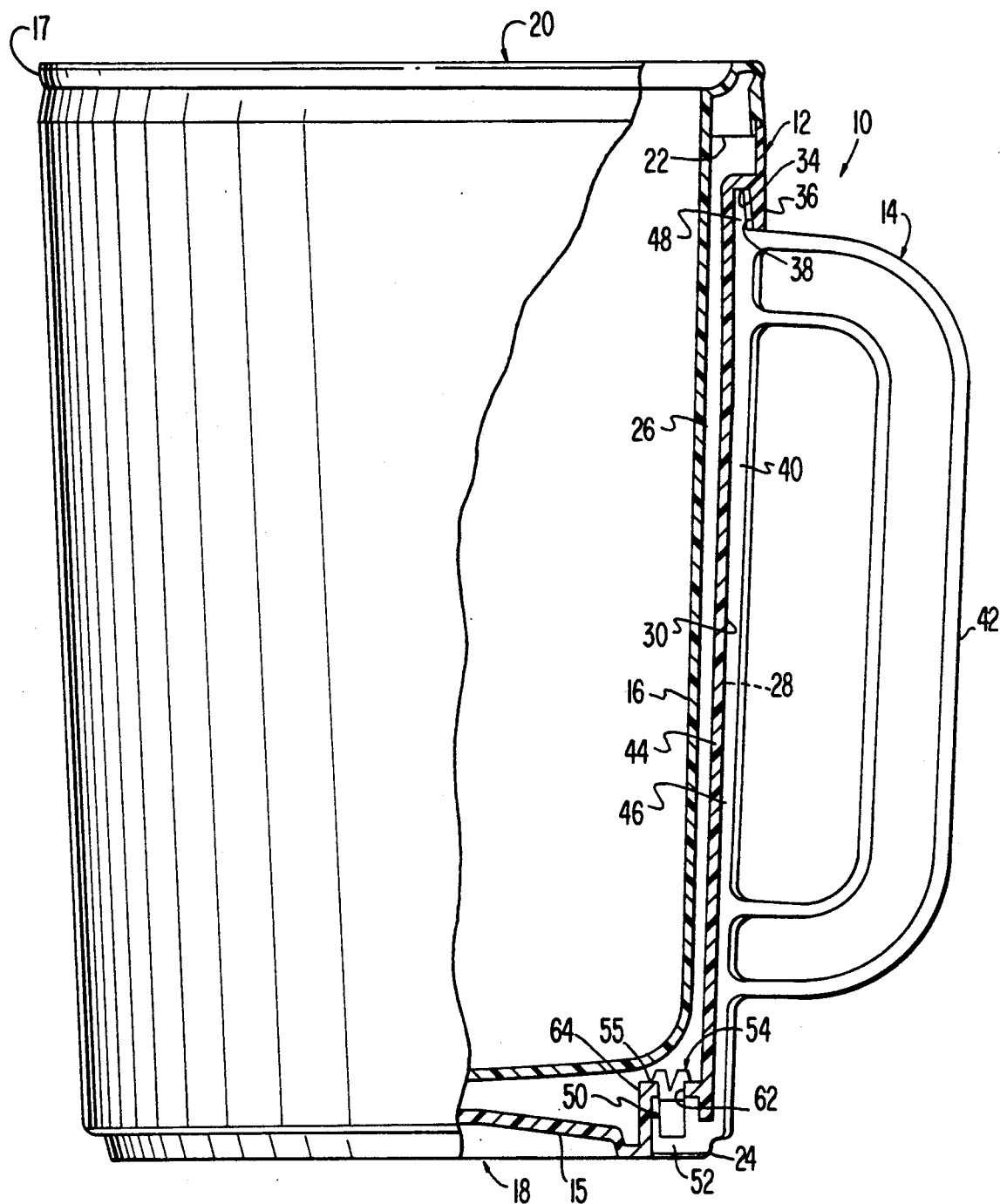
FIG. 1 is an elevational view, partly in section, of a liquid-bearing container organization constructed according to the present invention.

Generally designated as 10 in FIG. 1 is a container, such as a thermally insulated drinking cup, that includes a container body 12 and a handle member 14 constructed and arranged according to the present invention. The container body 12, as shown in the drawings, comprises a generally cylindrical outer shell 15 concentrically spaced from an inner shell 16 to define a container having a closed bottom end 18 and an open upper end 20. In practice, the respective shells 15 and 16 are molded from plastic material, assembled, and joined together by bonding, as at the seam 22. The inner shell 16, at its upper end, is provided with an appropriately curved lip surface 17 to facilitate the releasable attachment of a cover, which is not germane to this invention. The space 26 created between the outer shell 15 and inner shell 16 is here shown as being an empty plenum, but may be filled with a thermal insulating medium, such as polystyrene foam, or the like, in order to enhance the insulating characteristics of the container 10.

Figure 5:
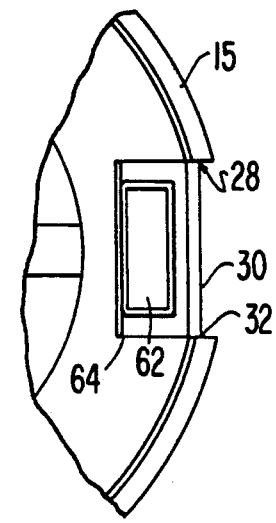
FIG. 5 is a view taken along line 5—5 of FIG. 4.
Figure 7:
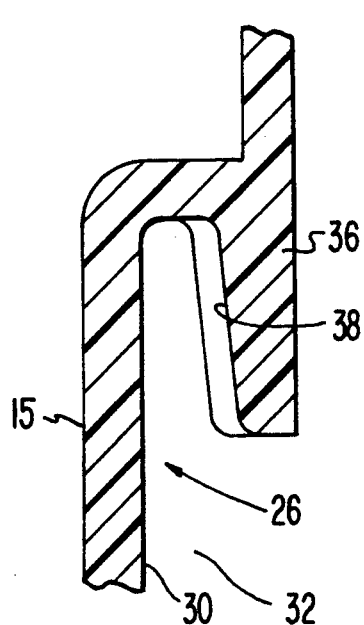
FIG. 7 is an enlarged detail view of the recess formed in the container illustrated in FIG. 1.
Figure 8:
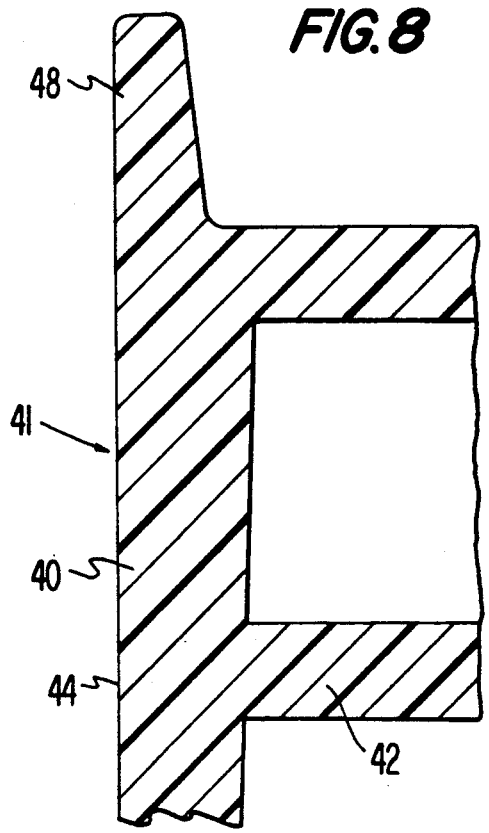
FIG. 8 is an enlarged sectional view of the handle member projection formed for reception in the recess of FIG. 7.

The exterior surface of the outer shell 15 is provided with a vertically elongated recess or channel 28 which extends from the lower end of the shell to a position slightly spaced from the upper end thereof. As shown best in FIG. 5, the recess 28 is defined by a substantially flat bearing surface 30 and side surfaces 32 extending substantially perpendicularly from opposite sides of the bearing surface. The recess 28, at its upper end is provided with a receptacle 34, formed by downwardly extending flange 36 whose interior surface 38 (FIG. 7) is spaced outwardly from the bearing surface 30 of the recess and which is arcuately formed with an upwardly and inwardly inclined taper for locking purposes, as hereafter more fully explained.

The bottom 18 of the outer shell 14 is formed with an annular rib 24 that defines a footing base for the container and may be useful for container-stacking purposes.

Figure 2:
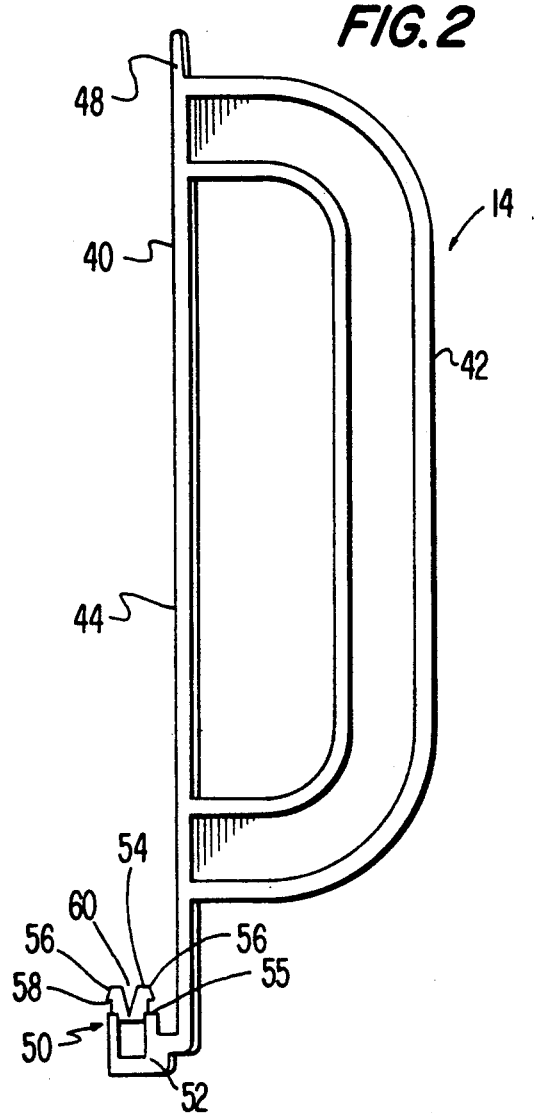
FIG. 2 is an elevational view of a preferred form of handle member adapted for use in the organization of FIG. 1.

The handle member 14 is formed of plastic material, suitably produced by injection molding, or similar process. This member, which is designed to be relatively rigid, as shown in FIG. 2, comprises a base 40 from the outer surface of which a hand grip portion 42 extends. The base 40 has an L-shape with the longer leg of which being formed with bearing surfaces 44 and 46 that conform generally to the shape of the recess bottom and side surfaces 30 and 32, respectively, in the container body 12 so as to be capable of fitted reception in the recess 28. At the upper end of the long leg of the base 40 a projection 48 is provided having an inclined shape which is substantially complementary to that of the receptacle 34 for reception therein. In order to effect a friction lock between the handle member projection 48 and the surfaces forming the receptacle 34, it is desirable to form the projection with slightly greater thickness dimensions as compared with the dimension of the space between recess bottom surface 30 and the interior surface of the flange 36.

Figure 3:
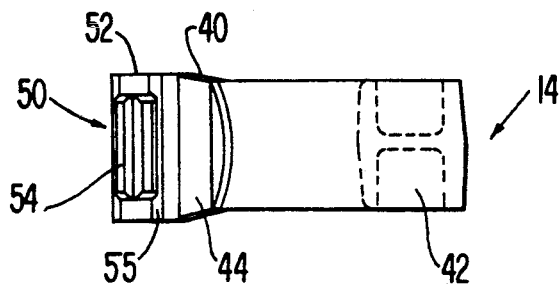
FIG. 3 is a top plan view of the handle member of FIG. 2.
Figure 4:
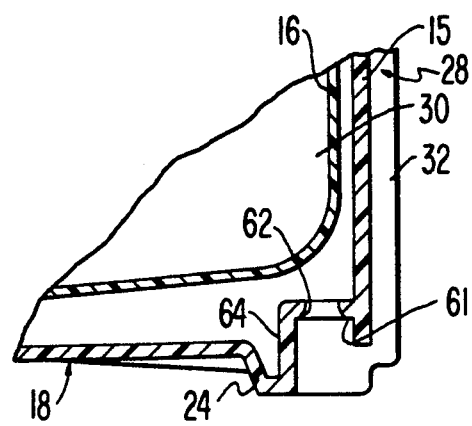
FIG. 4 is an enlarged partial sectional view of the bottom portion of the container body of the present invention illustrating the connecting element receptacle incorporated therein.

The short leg of the base 40 is substantially perpendicularly offset from the long leg thereof and is defined by an integrally formed connector device 50 that is comprised essentially of a support body 52 and an upstanding connecting element 54. The support body 52 presents upwardly directed bearing surfaces 55 for engagement with cooperating, downwardly facing surfaces on the container body. The connecting element 54 is, as shown best in FIG. 3, of a shape generally that of a rectangle whose long axis is substantially parallel to surface 44 of the base. The device consists essentially of a pair of upstanding legs 56 having a headed upper end defining shoulders 58. A V-shaped notch 60 disposed between the legs 56 permits them to flex oppositely inwardly and outwardly in order to securely lock the handle member within a hole 62 provided in an integrally formed lug 64 located at the lower end of the outer shell 15 of the container body 12.

Consequently, when the handle member 14 is assembled to the container body 12 by insertion its base 40 into the recess 28 with the projection 48 on the base received in the receptacle 34 at the upper end of the recess and the connecting element 54 received in the hole 62 in lug 64 of the container body, there is tight bearing engagement that occurs at both the upper end of the assembly and at the bottom end thereof. The engagement at the upper end is that occurring between the cooperating tapered surfaces on the projection 48 and flange 36. At the lower end of the assembly bearing engagement occurs between the upwardly directed bearing surfaces 55 of the connector support body 52 and the cooperating downwardly directed bearing surfaces 61 about the hole 62 in the lug 64.

The described arrangement creates a locked relationship between the handle member 14 and container body 12. At the upper end of the assembly this relationship is created by the friction effect between the cooperating tapered surfaces of the projection 48 and flange 36. At the lower end, the lock is a mechanical lock created by the cooperation of the shoulders 58 on the legs 56 of the connecting element with the upwardly facing surface around the hole 62 in the lug 64. Due to the physical configuration of the operative components of the assembly it will be appreciated that this locked relationship is enhanced by an increase in weight of the liquid carried by the container, since a greater load weight will only tend to increase the effect of the friction lock between the projection 48 and flange 36 and the bearing forces generated between the cooperating surfaces 55 and 61 on the connector device support body 52 and the lug 64 on the container body.

Figure 6:
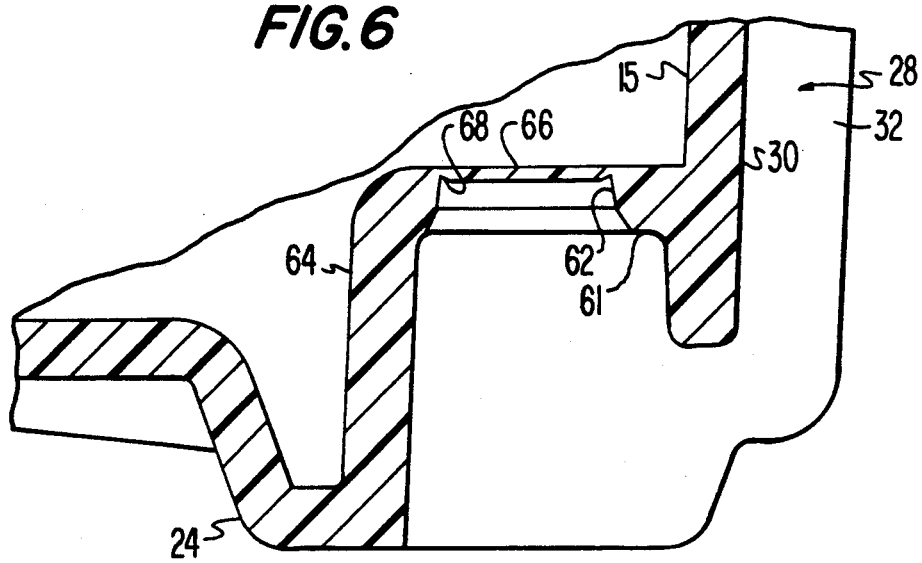
FIG. 6 is a view, similar to FIG. 4, illustrating the receptacle of FIG. 4 in an intermediate stage of apparatus production.

FIG. 6 of the drawings illustrates the lug 64 formed in the outer shell 15 of the container body 12 as being initially provided, during molding, with a thin membrane cover 66 that may be notched about its periphery, as shown at 68, to facilitate removal of the cover upon insertion of the connecting element 54 into the hole 62 during assembly of the handle member 14 to the container body 12. Provision of such a membrane cover in the hole 62 enables the filling of the plenum space 26 with insulating foam material without danger of obstructing the hole 62 to impede or prevent subsequent insertion of the connecting element 54.

It will be apparent from the above that the described container body and handle member arrangement permits the secure interconnection of these components and enables the maintenance of such interconnection against significant stress loads, thereby rendering the arrangement particularly suitable in containers for liquid, or the like, of relatively large capacity, as for example large drinking cups or pitchers for pouring liquids. Contributing to the desirable characteristics of the disclosed arrangement is the fact that the direction of the application of forces due to the bearing engagement between the container body 12 and handle member 14 existing at the interface between projection 48 and flange 36 and between the shoulders 58 of the connecting element legs 56 and bearing surface on the lug 64 around the hole 62, occur in the same direction. Thus, any increase in the weight of the contents of the container body 12 serves to increase the gripping or locking effect tending to hold the handle member 14 together with the container body 12.

Figure 9:
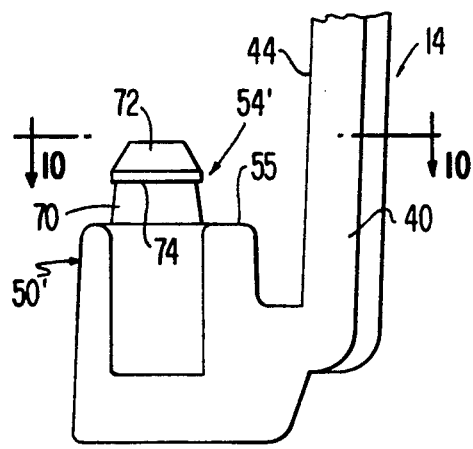
FIG. 9 is a partial elevational view illustrating an alternative embodiment of connector device suitable for use in the container organization of the present invention.
Figure 10:
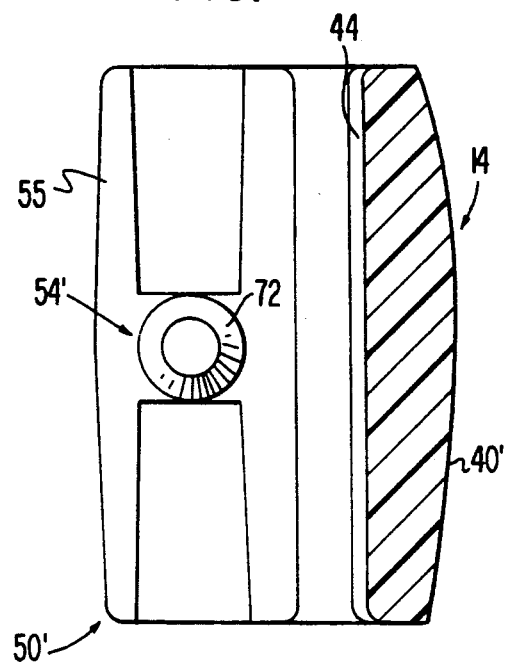
FIG. 10 is a view taken along line 10—10 of FIG. 9.
Figure 11:
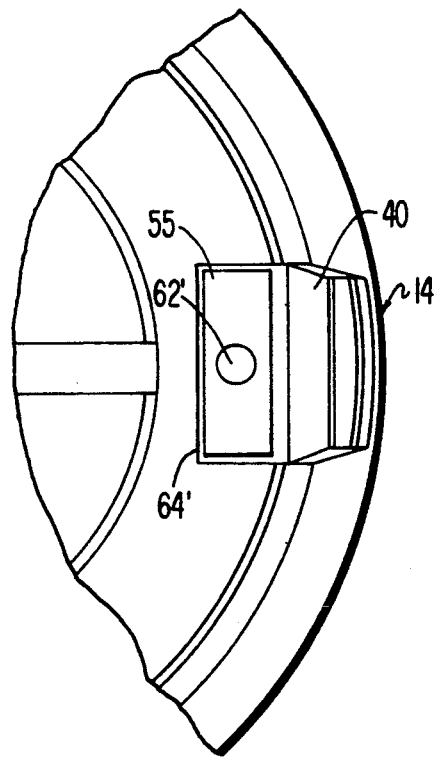
FIG. 11 is a plan view illustrating an alternate form of the receptacle of FIG. 4 for reception of the connecting element of the connector device of FIG. 9.

In FIGS. 9 to 11, where like numerals are used to designate like parts, there is shown an alternate form of connector device 50' that may be utilized in the practice of the invention. The illustrated connector device 50' comprises a connecting element 54' formed generally as a conical post 70 having a conical head 72 at its upper end that presents an annular, downward facing shoulder 74. The shoulder 74 creates a bearing surface, similar to that presented by the shoulders 58 on the legs 56 of the connecting element 54 of the previously described embodiment of the invention. The connector device 50' is designed to the received in a hole 62' of circular cross section in the lug 64' formed in the container body whereby an attachment between the handle member 14 and container body 12 similar to that occurring in the previously described embodiment is created.

It will be understood, therefore, that variations, changes in the details, materials, and arrangement of the parts which have been herein described and illustrated in order to explain the nature of the invention may be made by those skilled in the art within the principles and scope of the invnetion. What is sought to be protected herein is as recited in the appended claims.

I claim:

1. A container for liquid, or the like, having a handle affixed thereto, comprising:
    a body defining said container having an exterior wall surface;
    said exterior wall surface and a flange member outwardly spaced from said wall surface cooperating to form a downwardly opening receptacle extending substantially parallel to the axis of said container body;
    a separately formed, substantially rigid handle member including an elongated base portion disposed in bearing engagement relation with said container wall surface along substantially its full extent from said receptacle and a grip substantially coextensive with said base portion having its ends joined to said base portion and its intermediate portion spaced therefrom, said handle member having a projection formed adjacent one longitudinal end thereof insertable in said receptacle;
    a connector device integrally formed on the handle member adjacent the opposite end thereof having an upstanding connecting element operative for fixed connection to said exterior wall surface; and
    an opening formed in said exterior wall surface at a location longitudinally spaced from said receptacle, said opening received said connecting element to securely fix said connector device to said container body when said handle member projection is received in said receptacle, said projection and said connnecting element presenting load-bearing elements so received in said receptacle and said opening for the codirectional imposition of loads from said container to said handle.

2. The container according to claim 1 in which said body defining said container includes concentrically spaced inner and outer shell members with the space therebetween containing a thermal insulation medium.

3. The container according to claim 1 in which said handle member is formed with a generally L-shaped base portion having said projection extending from the long leg thereof and said connecting element being substantially perpendicularly disposed with respect to the short leg thereof.

4. The container according to claim 1 in which said projection and said flange member are formed with cooperating interengaging wedge surfaces.

5. The container according to claim 1 in which said connecting element comprises an expandable, headed connector having a shoulder cooperable with said exterior wall surface about the opening formed therein.

6. The container according to claim 5 in which said connecting element comprises a generally rectangular, laterally elongated body and said opening is rectangularly formed for reception of said connecting element.

7. The container according to claim 5 in which said connecting element and said opening are generally circular in cross section.

8. A container for liquid, or the like, having a handle affixed thereto, comprising, in combination:
    a container body including concentrically spaced inner and outer shell members defining a generally cylindrical exterior wall surface;
    a vertically elongated recess in said exterior wall surface for reception of a handle member;
    a downwardly extending flange member spaced outwardly from the surface of said recess and cooperating therewith to form a receptacle;
    a substantially rigid handle member separate from said container body and defined by an elongated base received in said container body recess;
    said handle member base being generally L-shaped and having a projection adjacent the upper end of the long leg thereof received in said receptacle and a connection device including a connecting element extending substantially perpendicularly from the short leg thereof; and
    an opening formed in said exterior wall surface adjacent the lower end of said recess, said opening receiving said connecting element to securely fix said connector device to said container body when said handle member projection is received in said receptacle.

9. The container according to claim 8 in which said projection and said connecting element present load-bearing elements disposed on said handle member so-received in said receptacle and said opening, respectively, for the codirectional imposition of loads.

10. The container according to claim 9 in which said projection and said flange member are formed with cooperatively interchanging wedge surfaces.

11. The container according to claim 10 including a lug integrally formed on said outer shell member and containing an opening whose axis is generally parallel to that of said recess and said connecting element comprising an expandable headed connector receivable in said opening and having a shoulder cooperable with a bearing surface on said lug to securely fix said connector device thereto.

12. The container according to claim 11 in which said connecting element comprises a generally rectangular, laterally elongated body and said opening is rectangularly formed for fitted reception of said connecting element.

13. The container according to claim 11 in which said connecting element and said opening are generally circular in cross section.

* * * * *